(12) United States Patent
Ikeda et al.

(10) Patent No.: US 8,960,883 B2
(45) Date of Patent: Feb. 24, 2015

(54) AQUEOUS INK FOR INKJET AND INKJET RECORDING METHOD

(75) Inventors: Masashi Ikeda, Koganei (JP); Hisashi Mori, Hino (JP)

(73) Assignee: Konica Minolta Holdings, Inc. (JP)

( * ) Notice: Subject to any disclaimer, the term of this patent is extended or adjusted under 35 U.S.C. 154(b) by 357 days.

(21) Appl. No.: 13/503,133

(22) PCT Filed: Sep. 21, 2010

(86) PCT No.: PCT/JP2010/066290
§ 371 (c)(1),
(2), (4) Date: Apr. 20, 2012

(87) PCT Pub. No.: WO2011/055595
PCT Pub. Date: May 12, 2011

(65) Prior Publication Data
US 2012/0218342 A1 Aug. 30, 2012

(30) Foreign Application Priority Data
Nov. 4, 2009 (JP) .................. 2009-252732

(51) Int. Cl.
*B41J 2/01* (2006.01)
*C09D 11/38* (2014.01)
(Continued)

(52) U.S. Cl.
CPC .............. *C09D 11/38* (2013.01); *B41J 2/2107* (2013.01); *B41M 5/0023* (2013.01); *C09D 11/322* (2013.01); *C09D 11/40* (2013.01)
USPC ............................................. 347/100; 347/95

(58) Field of Classification Search
CPC ...... C09D 11/322; C09D 11/38; C09D 11/30; C09D 11/101; C09D 11/40; C09D 11/36; C09D 11/005; C09D 11/52; C09D 11/328; C09D 11/54; B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21
USPC ........... 347/100, 95, 96, 101, 102, 88, 99, 20, 347/21, 9; 106/31.6, 31.13, 31.27; 523/160, 523/161
See application file for complete search history.

(56) References Cited

FOREIGN PATENT DOCUMENTS

DE 19610560 A1 9/1997
JP 9-90115 A 4/1997
(Continued)

OTHER PUBLICATIONS

Notification of Reasons for Refusal for Japanese Patent Application No. 2011-539314, drafted Apr. 2, 2014, with English translation.
(Continued)

*Primary Examiner* — Manish S Shah
(74) *Attorney, Agent, or Firm* — Cantor Colburn LLP (57) ABSTRACT

Disclosed is an aqueous ink for inkjet that contains water, pigment, organic or inorganic acid (A) and ammonia or amines (B) or ammonium salts of organic or inorganic acids, a resin having anionic groups (C), and an amphoteric resin having both anionic and cationic groups (D). The aqueous ink for inkjet is characterized by fulfilling the relationship pKa(A)<pKa(C)<7 when pKa(A) is the pKa of the organic or inorganic acid (A) and pKa(C) is the pKa of said resin having anionic groups (C). By means of the aqueous ink for inkjet and the inkjet recording method, the occurrence of bleeding during high-speed printing can be reduced, and a high detail image quality can be obtained.

6 Claims, 1 Drawing Sheet

(51) Int. Cl.
*B41J 2/21* (2006.01)
*C09D 11/322* (2014.01)
*C09D 11/40* (2014.01)
*B41M 5/00* (2006.01)

(56) References Cited

FOREIGN PATENT DOCUMENTS

| JP | 9-188843 A | 7/1997 | | |
| JP | 11-189741 A | 7/1999 | | |
| JP | 2001-500170 A | 1/2001 | | |
| JP | 2002-226739 A | 8/2002 | | |
| JP | 2004-10814 A | 1/2004 | | |
| JP | 2006-199896 A | 8/2006 | | |
| JP | 2006199896 A | * | 8/2006 | ............. C09D 11/00 |
| JP | 2008-208153 A | 9/2008 | | |
| JP | 2009-13394 A | 1/2009 | | |
| JP | 2009-226849 A | 10/2009 | | |
| JP | 2009226849 A | * | 10/2009 | ............... B41M 5/00 |

OTHER PUBLICATIONS

International Search Report for International Application No. PCT/JP2010/066290, mailed Nov. 9, 2010, with English translation.
Notification of Reasons for Refusal for Japanese Patent Application No. 2011-539314, drafted Oct. 25, 2013, with English translation.

* cited by examiner

AQUEOUS INK FOR INKJET AND INKJET RECORDING METHOD

CROSS REFERENCE TO RELATED APPLICATIONS

This is a U.S. national stage of application No. PCT/JP2010/066290, filed on 21 Sep. 2010. Priority under 35 U.S.C. §119(a) and 35 U.S.C. §365(b) is claimed from Japanese Application No. 2009-252732, filed 4 Nov. 2009, the disclosure of which are also incorporated herein by reference.

FIELD OF THE INVENTION

This invention relates to an aqueous inkjet ink for an inkjet recording and an inkjet recording method.

TECHNICAL BACKGROUND

An inkjet recording method can form an image easily and inexpensively, being thereby utilized in a wide variety of printing fields such as photography, various prints, signs, or color filters. When exclusive paper featuring optimum characteristics for inkjet recording is used, image quality comparable to that of silver halide photography can be realized. However, printing requiring such exclusive paper results in high cost and limited applications.

Over recent years, applications to high-speed printing to nonabsorbable media (vinyl chloride, art paper, or coated paper) have been expanding. However, when an image is formed on such a medium using aqueous inks, there has been produced such a problem that spotting and bleeding (hereinafter referred to as bleed) occur due to aggregation among inks. To improve this image quality degradation, it is known that ink viscosity needs to increase to some extent immediately after printing.

As a technology to improve image quality degradation by increasing viscosity immediately after printing, an inkjet ink containing a water soluble resin neutralized with an amine as a binder resin at 2%-10% in terms of solid is used, whereby bleed is considered to be improved via a method of printing while a recording medium is heated (for example, Patent Document 1). It is described that such ink viscosity increase is specifically markedly exhibited in an ink employing a water soluble organic solvent selected from glycol ethers or 1,2-alkanediols. It is thought that drying accelerates water evaporation, whereby the ratio of a glycol ether or 1,2-alkanediol component in a deposited ink is increased and then the interaction of each resin is enhanced, resulting in an increase in ink viscosity.

Although this method realizes an increase in viscosity after deposition due to heating and the presence of a specific solvent and also bleed is improved to some extent in a nonabsorbable medium, the increasing rate of ink viscosity has been inadequate in high-speed printing. Therefore, to achieve high image quality in high-speed printing, a rapid viscosity increase after ink deposition is a critical challenge.

Further, as another technology, disclosed is a thermal history display dye ink which contains an allochroic dye varying with pH changes and a volatile organic amine; and utilizes a pH decrease via volatilization of an ammonium salt, (for example, Patent Document 2). However, deposition and aggregation of a resin and a pigment utilizing such a pH decrease are not described.

It is described that a hydrolyzable silane compound and an ammonium salt are contained, and the ammonium salt releases an amine or ammonia with water evaporation; and then the action of the residual acid accelerates polycondensation reaction, resulting in enhanced water resistance (for example, Patent Document 3). However, it is not specifically described that a resin having a higher pKa than an acid component formed by dissociation of an amine salt in ink is contained, and no disclosure is made with respect to a technological thought on viscosity increase using deposition and aggregation of a resin and a pigment to improve image quality.

It is described that an ink containing barium hydroxide and an ammonium salt can reduce bleed. A viscosity increase via endothermic reaction of such barium hydroxide and an ammonium salt is utilized, but it is not specifically described that a resin is contained (for example, Patent Document 4).

It is described that a treating solution for changing pH is treated to an ink which includes positively or negatively charged water insoluble particles A and water insoluble particles B having both of cationic group and anionic group and changes c potential by changing of surrounding pH environment, whereby aggregation rate is accelerated by utilizing polarity inversion (for example, Patent Documents 5). However, the treating solution for changing pH is necessary, and also required are a large size printer and a complicate process.

PRIOR TECHNICAL DOCUMENT

Patent Document

Patent Document 1: Unexamined Japanese Patent Application Publication (hereinafter referred to as JP-A) No. 2008-208153
Patent Document 2: JP-A No. 11-189741
Patent Document 3: JP-A No. 2004-10814
Patent Document 4: JP-A No. 2002-226739
Patent Document 5: JP-A No. 2009-13394

SUMMARY

Problems to be Solved by the Present Invention

An object of the present invention is to provide an aqueous inkjet ink and an inkjet recording method enabling to decrease bleed occurrence during high-speed printing and to realize highly detailed image quality. Specifically, the object is to provide an inkjet recording method preventing bleed generated during high-speed printing to a nonabsorbable medium.

Means to Solve the Problems

The above object of the present invention can be achieved by the following constitution:

1. An aqueous ink for an inkjet recording comprising a water, a pigment, an organic or an inorganic acid (A), and an ammonia or an amine (B) or an ammonium salt comprising the organic or the inorganic acid (A) and the ammonia or the amine (B), a resin having an anionic groups (C), and an amphoteric resin having both an anionic and a cationic group (D), wherein the following relationship is satisfied: pKa(A)<pKa(C)<7, provided that pKa(A) represents pKa of the organic or the inorganic acid (A) and pKa(C) represents pKa of the resin having the anionic group (C).

2. The aqueous ink for the inkjet recording of item 1, wherein pKa of the organic or the inorganic acid (A) is not more than 5.

3. The aqueous ink for the inkjet recording of item 1 or 2 comprising a water of not less than 20% by mass and not more than 90% by mass.
4. The aqueous ink for the inkjet recording of any one of items 1 to 3, wherein the pigment is dispersed by the resin having the anionic groups (C).
5. An inkjet recording method utilizing the aqueous ink for the inkjet recording of any one of items 1 to 4, wherein an image forming surface is heated.
6. The inkjet recording method of item 5, wherein the image forming surface is heated at not more than 40° C. and not less than 90° C.

Effects of the Invention

By means of the inkjet recording method according to the present invention, the occurrence of bleeding during high-speed printing can be reduced, and a high detail image quality can be obtained.

PREFERRED EMBODIMENT OF THE INVENTION

To achieve the above object, the present inventors conducted diligent investigations and thereby found the followings. It was inadequate for high-speed printing that an interaction between resins was subjected to increase by increasing a ratio of a specific solvent via water evaporation by drying. In order to further increase the ink viscosity increasing rate, it was effective that the pH of an ink was decreased, thereby charge repulsion between resins for dispersing pigment was decreased and pigments were subjected to be aggregated by increasing the interaction. The present inventors found that it was more effective to increase the ink viscosity increasing rate when a polarity of an amphoteric resin was subjected to be preferentially inverted, and a cationic group of the amphoteric resin having inverted polarity and an anionic group of dispersing resin for pigment were attracted by the interaction, resulting in bridging between pigments by the amphoteric resin.

In an ink containing an ammonia or an amine-neutralized resin, when pH changes were examined during evaporation of the ink on a heated medium, it was found that the pH was decreased to some extent via evaporation of the ammonia or the amine in the ink; but the pH was not decreased to the extent that the resin and the pigment was deposited and aggregated where the resin was in an undissociated state. The reason is presumed as follows: the energy to dissociate an ammonia or an amine which is a counter of a resin is larger than the energy provided for the ink by heating of several tens degrees, and thereby, a most amount of the ammonia or the amine in the counter can not be volatilized in a short period of time, resulting in no pH decrease.

Therefore, the present inventors lead to a following technological thought: pH decrease is accelerated by adding and by heating an organic or an inorganic acid and an ammonia or an amine, or an ammonium salt comprising the organic or the inorganic acid and the ammonia or the amine described in the present invention. The pH is decreased to an extent that the pigment dispersing resin is in an undissociated state which decreases the charge repulsion at the pigment surface, the ink viscosity increasing rate is increased. It is more effective to increase the ink viscosity increasing rate that when a polarity of an amphoteric resin was subjected to be inverted by reducing pH of the ink to be 7 or less, a cationic group of the amphoteric resin having inverted polarity and an anionic group of dispersing resin for pigment are attracted by the interaction, resulting in bridging between pigments by the amphoteric resin.

Embodiments of the present invention will now be specifically described, however the present invention is not limited thereto.

<<Aqueous Ink for Inkjet Recording>>

The present invention relates to an aqueous ink for an inkjet recording comprising a water, a pigment, an organic or an inorganic acid (A), and an ammonia or an amine (B) or an ammonium salt comprising the organic or the inorganic acid (A) and the ammonia or the amine (B), a resin having an anionic groups (C), and an amphoteric resin having both an anionic and a cationic group (D), wherein the following relationship is satisfied: $pKa(A) < pKa(C) < 7$, provided that pKa (A) represents pKa of the organic or the inorganic acid (A) and pKa(C) represents pKa of the resin having the anionic group (C). Furthermore, heating an image forming face at from 40° C. to 90° C. results in an effect of decreasing bleed.

It is known that the viscosity of an ink is increased after deposition and then the flowage thereof is prevented, whereby bleed is reduced. Also in the present invention, it is thought that image quality was improved via the viscosity increase of an ink after deposition.

The inventors of the present invention presume that the viscosity increasing rate of the ink of the present invention is increased by decreasing pH to an extent that the pigment dispersing resin is in an undissociated state in which the charge repulsion at the pigment surface decreases and pigments are aggregated by loosing the charge. Further, in the case of including an amphoteric resin in an ink, since a concentration of $H^+$ increases in an acidic circumstance by decreasing an ink pH, whereby a polarity of an amphoteric resin is subjected to be inverted, a cationic group of the amphoteric resin having inverted polarity and an anionic group of dispersing resin for pigment are attracted by the interaction, resulting in bridging between pigments by the amphoteric resin and further increasing the ink viscosity increasing rate.

Above mentioned object can be attained in a case where the following relationship is satisfied: $pKa(A) < pKa(C) < 7$, provided that pKa(A) represents pKa of the organic or the inorganic acid (A) and pKa(C) represents pKa of the resin having the anionic group (C).

An ammonia or an amine in the ink is released as an ammonia or an amine after deposition, whereby $H^+$ in the liquid is increased, resulting in a pH decrease.

Only an acid component of pKa 5 or less having been dissociated in the ink remains via volatilization of such ammonia or an amine, thereby aqueous solution becomes acidic according to increasing volatilization amount. Therefore, the amphoteric resin has a cationic property in an acidic circumstance by changing pH via volatilization of ammonia or an amine, even though it has an anionic property in a basic circumstance.

Since the resin having the anionic group has pKa of less than 7, a part of the anionic group is blocked and looses a charge repulsion in the acidic circumstance of the ink, but the resin having the anionic group does not loose a charge completely and has an anionic property.

As a result, the anionic group at the pigment surface and the cationic group of the amphoteric resin are attracted and forms networks via pigments, resulting in rapid increase of ink viscosity.

By the presence of a water soluble salt, the ink is concentrated via evaporation of water and the concentration of solids is increased, whereby the aggregation of the pigment is further accelerated via salting-out. The above effect is produced to a large extent when an organic or inorganic acid and an ammonia or an amine are formed from an organic or inorganic ammonium salt, and further a specifically large effect is produced when the resin is water soluble resin.

(Organic or Inorganic Acids)

With regard to an organic or inorganic acid according to the present invention, any acids are usable if a pKa relationship is satisfied with respect to a resin present in an ink. Any of these acids exists in the state of an ion dissociated from a hydrogen ion in the ink, in a state of combination with a hydrogen ion, or in both states. In the present invention, those in any state in the ink are referred to as acids. As the acids, listed are, for example, phosphoric acid, sulfuric acid, acetic acid, citric acid, phthalic acid, lactic acid, benzoic acid, succinic acid, salicylic acid, tartaric acid, amidosulfuric acid, oxalic acid, formic acid, hydrofluoric acid, hydrochloric acid, bromic acid, iodic acid, and nitric acid, which, however, are not limited thereto.

An organic or inorganic acid used in the present invention preferably has a pKa of at most 5. When plural acids are added, the lowest pKa needs only to be at most 5. Incidentally, the pKa herein referred to represents the logarithmic value of the reciprocal of acid dissociation constant Ka, and a smaller numeric value thereof represents a stronger acid and a larger numeric value represents a weaker acid.

As ammonia or amines according to the present invention, listed are, in addition to ammonia, monoethanolamine, diethanolamine, triethanolamine, ethyl monoethanolamine, n-butyl monoethanolamine, dimethyl ethanolamine, diethyl ethanolamine, ethyl diethanolamine, n-butyl diethanolamine, din-butyl ethanolamine, and triisopropanolamine, which, however, are not limited thereto.

The concentration of any of these ammonium ions in an ink is preferably not less than 0.01 mol/L and not more than 3 mol/L.

(Organic or Inorganic Ammonium Salts)

An organic or inorganic ammonium salt according to the present invention has a pKa of not more than 5 as an acid component formed via dissociation of the amine salt in the ink, representing one obtained via neutralization of the acid component with an ammonium ion or an organic amine. With regard to acid components having plural pKa's, the lowest pKa is preferable not more than 5.

As organic or inorganic ammonium salts obtained via neutralization of an acid component with an ammonium ion, listed are, for example, tri-ammonium phosphate, ammonium sulfide, ammonium acetate, di-ammonium citrate, tri-ammonium citrate, ammonium phthalate, ammonium lactate, ammonium benzoate, ammonium succinate, ammonium salicylate, ammonium tartrate, ammonium hydrogen tartrate, ammonium amidosulfate, ammonium oxalate, ammonium hydrogen oxalate, ammonium formate, ammonium fluoride, ammonium chloride, ammonium bromide, ammonium iodide, ammonium nitrate, and ammonium sulfate, which, however, are not limited thereto.

An amine may be used instead of an ammonium ion, and examples of the amine include monoethanolamine, diethanolamine, triethanolamine, ethyl monoethanolamine, n-butyl monoethanolamine, dimethyl ethanolamine, diethyl ethanolamine, ethyl diethanolamine, n-butyl diethanolamine, di-n-butyl ethanolamine, and triisopropanolamine, which, however, are not limited thereto.

To further produce the effects of the present invention, a salt obtained via neutralization with an ammonium ion having a low-boiling point is preferable. Preferable are ammonium acetate, di-ammonium citrate, tri-ammonium citrate, ammonium phthalate, ammonium lactate, ammonium benzoate, ammonium succinate, ammonium salicylate, ammonium tartrate, ammonium hydrogen tartrate, ammonium amidosulfate, ammonium formate, ammonium fluoride, ammonium chloride, ammonium bromide, ammonium iodide, ammonium nitrate, and ammonium sulfate. Of these, ammonium acetate, ammonium lactate, ammonium salicylate, ammonium tartrate, and ammonium formate are more preferable.

In the preferred embodiment of the present invention, to realize the action of pH decrease, an organic or inorganic ammonium salt is intentionally added.

The added amount of the organic or inorganic ammonium salt is preferably from 0.1% to 10% in terms of mass percentage based on the total ink amount, more preferably not less than 0.2% and less than 5.0%. In the case of at least 0.1%, the pH of the ink can adequately be decreased. In the case of at most 10%, it is preferable because deterioration of the working environment caused by the increase of the amount of ammonia or amine released via volatilization can be reduced.

(Resins Having Anionic Group)

A resin having an anionic group according to the present invention (hereinafter, also referred to as Resin C) is characterized as a resin having a higher pKa as an acid component of the resin than the pKa of the above organic or inorganic acid. When the organic or inorganic acid is supplied into an ink from an organic or inorganic ammonium salt comprising organic or inorganic acid and the ammonia or the amine, preferable is a resin having a higher pKa as an acid component of the resin than the pKa of an acid component formed via dissociation of an ammonium salt in the ink.

The resin may be adsorbed to a pigment or may be present in the dissolved state for fixability or gloss enhancement. However, the state of being adsorbed to the pigment is preferable. In view of increasing viscosity, in addition to a resin adsorbed to the pigment, the resin is preferably added further in ink preparation, since the interaction of each resin or each pigment, or between the resin and the pigment is allowed to increase when pH is decreased.

Herein, a resin adsorbed to the pigment and a resin added in ink preparation may be the same or differ. When a plurality of the resins is added, at least one type thereof needs only to be a resin having a higher pKa as an acid component of the resin than the pKa of an organic or inorganic acid. All the plural resins added preferably have higher pKa's as the acid components of the resins than the pKa of such an organic or inorganic acid.

A Resin C of the present invention having a higher pKa than the pKa of the organic or inorganic acid is preferably water soluble.

Neutralization of an acid component of a resin is not specifically limited. As examples of the neutralization, an ammonium, sodium, and lithium are cited. A counter ammonium is volatilized after drying. Therefore, from the viewpoint of water resistance, a resin having an acid neutralized with an ammonium is preferable.

A Resin C according to the present invention is preferably a resin in which an acid functional group such as a carboxyl group or a sulfo group is contained in a resin and the acid functional group in the resin is neutralized with an ammonium. Specific examples can be realized in such a manner that a part of a resin such as acrylic-based, styrene acrylic-based, acrylonitrile-acrylic-based, vinyl acetate acrylic-based, polyurethane-based, or polyester-based one is modified with an acid such as a carboxyl group or a sulfo group and then the resin is neutralized with an amine. As examples of such an amine used for neutralization, ammonia, dimethylamine, diethylamine, and ethylmethylamine are preferable. Ammonia of a low boiling point to further produce the effects of the present invention is specifically preferable.

A Resin C having an acid can be obtained by polymerizing a monomer. As such a monomer, those obtained via radical copolymerization of acrylic acid, methacrylic acid, itaconic acid, fumaric acid, or acid derivatives of styrene are listed. Further, copolymerization with another monomer may be carried out if appropriate.

The weight average molecular weight of a Resin C having an acid is preferably not less than 3,000 from the viewpoint of an image quality improvement effect according to the present invention and is preferably not more than 30,000 from the viewpoint of ejection properties and viscosity, more preferably from not less than 10,000 to not more than 20,000. Further, the acid value is preferably from not less than 60 mgKOH/g to less than 300 mgKOH/g.

The content of a Resin C according to the present invention is preferably from 0.5% to 15% based on the total ink amount, more preferably from 2.0% to 10%. The content of a resin having an acid neutralized with an ammonia or an amine is from 0.5% to 15% based on the total ink amount, more preferably from 2.0% to 10%. In the case of not less than 0.5%, an adequate viscosity increasing effect is produced. In the case of not more than 15%, enhancement of reducing bleeding is expected and excellent ejection properties are maintained.

(Water Dispersed Resin C)

The water dispersed Resin C used in the present invention is made of a resin having a water soluble functional group such as a carboxylic group or a sulfo group. Examples of the water dispersed resin are made of at least one of the following group comprising: a vinyl acetate based resin, a styrene-butadiene based resin, a vinyl chloride based resin, an acrylic-styrene based resin, a butadiene based resin, a styrene based resin, or it may be a mixture of these resins.

It is more preferable to use a Resin C having a carboxylic group which has a small dissociation rate from the viewpoint of producing high speed aggregation effect of the water dispersed Resin C. Since a carboxylic acid group tends to be influenced by a pH change, a dispersion state changes easily and its aggregation property is high. Examples of a resin component used for a water dispersed resin in the ink are: an acrylic based resin, a vinyl acetate based resin, a styrene-butadiene based resin, a vinyl chloride based resin, an acrylic-styrene based resin, a butadiene based resin and styrene based resin.

The change of a dispersion state in response to the pH change of the water dispersed Resin C can be adjusted with the content ratio of the composition ingredient in water dispersed Resin C which has carboxylic acid groups, such as acrylic ester, and can be adjusted also with the anionic surfactant used as a dispersing agent.

As for the resin component of the water dispersed Resin C, it is preferable that it is a polymer having both a hydrophilic portion and a hydrophobic part in the molecule. By having a hydrophobic part, it is possible that a hydrophobic part will be orientated to the inside of the water dispersed Resin C, and a hydrophilic portion will be effectively orientated to the outside of the water dispersed Resin C. As a result, the change of a dispersion state in response to the pH change of a liquid will become larger, and aggregation of the ink will be performed more efficiently.

Examples of a water dispersed Resin C commercially available include: Joncryl 537 and 7640 (styrene-acrylic resin emulsion, made by Johnson Polymer Co., Ltd.), Microgel E-1002 and E-5002 (styrene-acrylic resin emulsion, made by Nippon Paint Co., Ltd.), Voncoat 4001 (acrylic resin emulsion, made by Dainippon Ink and Chemicals Co., Ltd.), Voncoat 5454 (styrene-acrylic resin emulsion, made by Dainippon Ink and Chemicals Co., Ltd.), SAE-1014 (styrene-acrylic resin emulsion, made by Zeon Japan Co., Ltd.), Jurymer ET-410 (acrylic resin emulsion, made by Nihon Junyaku Co., Ltd.), Aron HD-5 and A-104 (acrylic resin emulsion, made by Toa Gosei Co., Ltd.), Saibinol SK-200 (acrylic resin emulsion, made by Saiden Chemical Industry Co., Ltd.), and Zaikthene L (acrylic resin emulsion, made by Sumitomo Seika Chemicals Co., Ltd.). However, the water dispersed resin emulsion is not limited to these examples.

The content of the water dispersed Resin C added in the ink of the present invention is preferably from 2 to 40% by mass based on the total mass of the ink, and it is more preferably from 5 to 30% by mass, and it is still more preferably from 10 to 25% by mass.

The weight average molecular weight of the water dispersed Resin C added to the ink is preferably not less than 5,000 from the viewpoint of adhesion strength after fusion. In the case of less than 5,000, it results in insufficient effect in enhancing internal cohesion force of resulting ink aggregate or fixation of image onto a recording medium and further insufficient effect in improving image quality.

The volume average particle size of the water dispersed Resin C is preferably from 10 nm to 1 μm, it is more preferably from 10 to 500 nm, and it is still more preferably from 20 to 200 nm, and especially preferably it is from 50 to 200 nm. When the particle size is not less than 10 nm, effects in improving the image quality can be expected. When the particle size is less than 1 μm, there may be a possibility that the ejection characteristics of the ink from the inkjet head or the storage stability of the ink will be improved. In addition, there are no specific restrictions to the volume average particle size distribution of the polymer particles, and it is possible that the polymer particles have a broad volume average particle size distribution or the polymer particles have a volume average particle size distribution of monodisperse type.

Moreover, two or more types of water dispersed Resins C may be used in combination in the ink.

Examples of a pH adjuster added to the ink in the present invention include an organic base and an inorganic alkali base, as a neutralizing agent. In order to improve storage stability of the ink for inkjet recording, the pH adjuster is preferably added in such a manner that the ink for inkjet recording has the pH value in the range of 6 to 10.

(Amphoteric Resin Having Both Anionic Group and Cationic Group)

An amphoteric resin having both anionic group and cationic group concerning to the present invention is characterized by that a resin has a cationic group and an anionic group in a side chain of a resin having a main chain comprising poly acrylic based, styrene-acrylic based, acrylonitrile-acrylic based, a vinyl acetate-acrylic based, polyurethane based and a polyester based resin, or a resin has various side chains having betaine group. Herein, "having betaine group" refers to as a general term of the constitution where compound has both of an anionic group and a cationic group at not adjacent position. A cationic group includes tertiary ammonium, and an anionic group includes —COO⁻, —SO₃⁻, —PO₃²⁻, —OSO₃⁻, —PO₂, and —OPO₃⁻.

Specific examples of betaine polymer used in the present invention include homopolymers such as poly[(meth)acryl amide alkyl ammonium alkyl carbobetaine], poly[(meth) acryl amide alkyl ammonium alkyl sulfobetaine], poly [(meth)acryloyl oxyalkyl ammonium alkyl carbobetaine], poly[(meth)acryloyl oxy-alkyl ammonium alkyl sulfobetaine], poly[allyldimethyl carboxymethyl ammonium betaine], polyoxyethylene-methyl hydroxyethylamino carbobetaine, poly[N-carboxymethyl-4-vinyl pyridinium betaine], poly[4-vinylpyridine-N-alkyl sulfobetaine], poly [trimethylamine-4-vinylbenzimide], poly[hydroxypropyl dimethylamine-methacrylimide], poly[dimethyl alkylamine-methacrylimide] and poly[(meth)acryloyl oxyethyl phosphoryl choline], and copolymers prepared by these monomers having betaine group with an additional monomers such as (meth)acrylic acid, (meth)acrylic ester, (meth)acrylamides, vinyl carboxylate, vinyl alkylethers, N-vinylpyridine, N-vinyl pyrrolidone, or N-vinyl carboxyamide. Either commercially available on the market or synthesized can be utilized as above polymers.

A content of the amphoteric resin having both anionic group and cationic group concerning to the present invention is preferably 0.5%-15% in terms of solids based on all mass of an ink, and is more preferably 2.0%-10%. In the case of not less than 0.5%, an effect of a viscosity increase will be obtained and in the case of less than 15%, excellent injection can be maintained.

(Water Dispersed Resin D)

Water dispersed resin D may be any of a compound which can change potential according to pH change of circumstance, however more preferably is a compound which converts a polarity to the opposite polarity of the resin (C) having an anionic group which charges negatively by pH change of circumstance.

A mol ratio of an anionic group and a cationic group in a water dispersed resin D is preferable in the range of from 80:20 to 20:80, more preferable in the range of from 60:40 to 20:80, still more preferable in the range of from 50:50 to 30:70. When a cationic group is greater in the mol ratio of an anionic group and a cationic group in a water dispersed resin D, a positive charge becomes dominant, thereby it is effective to enhance an aggregation reaction rate with a resin having the negatively charged anionic group.

A water dispersed resin D has a content of a water soluble component of not more than 5% by mass, but preferably not more than 3% by mass. In the case of a content of a water soluble component being not more than 5% by mass, a stable ejection can be obtained.

The water soluble component is a compound included in a resin constituting a water dispersed resin D and can be soluble in water when the resin is dispersed in water as a continuous phase. The water soluble component is a water soluble compound, which is, for example, by-produced or mixed into during a production of the resin.

A polymer compound constituting a water dispersed resin D preferably has a range of a molecular weight of from 3,000 to 200,000, more preferably from 5,000 to 150,000, still more preferably from 10,000 to 100,000 in weight average molecular weight. In the case of weight average molecular weight of 3,000 or more, a content of water soluble component can be effectively suppressed. In the case of weight average molecular weight of 200,000 or less, self-dispersing stability can be enhanced. Herein, the weight average molecular weight can be determined by a gel permeation chromatography (GPC).

The water dispersed resin D according to the present invention is preferable a self-dispersing polymer particles, in view of an ink aggregation and an ink ejection properties. The self-dispersing polymer in the present invention is a water dispersed polymer which can be in a dispersed state in an aqueous medium by a functional group (specifically, an anionic group, a cationic group or a salt thereof) in the polymer itself without the presence of any surfactant. Herein, the dispersed state includes following both states: an emulsifying state (emulsion) in which a water insoluble polymer is dispersed in a liquid state in an aqueous medium and a dispersing state (suspension) in which a water insoluble polymer is dispersed in a solid state in an aqueous medium.

In view of ink fixation in case of including it in as ink composition, the self-dispersing polymer described above is preferable a self-dispersing polymer.

Specific example of a method for preparing an aqueous dispersion of a self-dispersing polymer in an emulsifying state or in a dispersing state includes a method in which a self-dispersing polymer is dissolved or dispersed in a solvent (for example, an aqueous organic solvent), then the resulting liquid is put into water without adding surfactant and stirred and mixed in a state of neutralizing a salt forming group in the self-dispersing polymer (for example, anionic group). After eliminating the solvent, water insoluble particles in a state of emulsion or dispersion is obtained.

There is not specific limitation in methods for preparing a polymer compound constituting the water insoluble particles described above, but polymer compound can be prepared by copolymerizing monomer mixture via well-known polymerization method such as a solution polymerization method or a bulk polymerization method. Of these, the solution polymerization method is preferable in view of jetting stability of an ink composition.

In the production method described above, the polymer compound can be produced appropriately by copolymerization reaction of monomer mixture with a mixture containing an organic solvent and a radical polymerization initiator under inert gas ambience.

In the present invention, in view of aggregation and ejection properties of the ink, the water insoluble particles described above are preferably synthesized in an organic solvent and a part of or all of anionic group is neutralized and prepared as a polymer dispersion having water as a continuous phase. Further, it is preferable that the anionic group is carboxyl group.

<Other Resins>

Further, an ink according to the present invention may contain resins differing from a resin neutralized with the above ammonium for various purposes. Plural types of these resins may be added or copolymers thereof may be added, or these polymers may be dispersed in an emulsion state. When dispersion is carried out in such an emulsion state, from the viewpoint of impairing ejection properties based on an inkjet system, the average particle diameter of resin fine particles is preferably not more than 300 nm. In the case of a water soluble polymer, the composition and the molecular weight are not specifically limited, but the weight average molecular weight is preferably not more than 50,000.

<Water Soluble Organic Solvents>

In an ink according to the present invention, a water soluble organic solvent is preferably contained, as an ink solvent for dissolving the above resin, in addition to water of from not less than 20% by mass to not more than 90% by mass for ejection properties enhancement and ink physical properties adjustment. Unless the effects of the present invention is impaired, types of water soluble organic solvents are not specifically limited, including, for example, glycerin, propylene glycol, dipropylene glycol, tripropylene glycol, tetrapropylene glycol, polypropylene glycol, ethylene glycol, diethylene glycol, triethylene glycol, tetraethylene glycol, polyethylene glycol, decaglycerin, 1,4-butanediol, 1,3-butanediol, 1,2,6-hexanetriol, 2-pyrrolidinone, dimethylimidazolidinone, ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, propylene glycol monobutyl ether, dipropylene glycol monomethyl ether, dipropylene glycol monoethyl ether, dipropylene glycol monopropyl ether, diethylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, tripropylene glycol dibutyl ether, 3-methyl-2,4-pentanediol, diethylene glycol monoethyl ether acetate, 1,2-hexanediol, 1,2-pentanediol, and 1,2-butanediol.

<Pigment>

As a pigment usable for an ink according to the present invention, those conventionally well-known can be used with no limitation. Any water-dispersible pigments and solvent-dispersible pigments are usable. For example, organic pigments such as insoluble pigments or lake pigments and inorganic pigments such as carbon black can preferably be used.

Such insoluble pigments are not specifically limited. Preferable are, for example, azo, azomethine, methine, diphenylmethane, triphenylmethane, quinacridone, anthraquinone, perylene, indigo, quinophtharone, isoindolinone, isoindoline, azine, oxazine, thiazine, dioxazine, thiazole, phthalocyanine, and diketopyrrolopyrrole.

As specific pigments which are preferably usable, the following pigments are listed:

As magenta or red pigments, listed are, for example, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

As orange or yellow pigments, listed are, for example, C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 74, C.I. Pigment Yellow 93, C.I. Pigment Yellow 128, C.I. Pigment Yellow 94, and C.I. Pigment Yellow 138.

As green or cyan pigments, listed are, for example, C.I. Pigment Blue 15, C.I. Pigment Blue 15:2, C.I. Pigment Blue 15:3, C.I. Pigment Blue 16, C.I. Pigment Blue 60, and C.I. Pigment Green 7.

Other than the above pigments, when red, green, blue, or intermediate colors are required, the following pigments are preferably used individually or in combination. Used are, for example, C.I. Pigment Red: 209, 224, 177, and 194; C.I. Pigment Orange: 43; C.I. Vat Violet: 3; C.I. Pigment Violet: 19, 23, and 37; C.I. Pigment Green: 36 and 7; and C.I. Pigment Blue: 15:6. Further, as black pigments, C.I. Pigment Black 1, C.I. Pigment Black 6, and C.I. Pigment Black 7 are listed.

Any pigment used in the present invention is preferably used via dispersion using a homogenizer, together with polymer dispersants, as well as additives required for various desired purposes. As the homogenizer, usable are a well-known ball mill, sand mill, line mill, and high-pressure homogenizer. The average particle diameter of a pigment dispersion used for an ink according to the present invention is preferably not less than 10 nm and less than 200 nm, more preferably not less than 10 nm and less than 100 nm, further preferably not less than 10 nm and less than 50 nm.

Particle diameter determination can be carried out using a commercially available particle diameter analyzer employing, for example, a light scattering method, an electrophoretic method, or a laser Doppler method. Further, using a transmission electron microscope, pigment particle image photographing is carried out for at least 100 particles and this image is statistically processed using an image analyzing software such as Image-Pro (produced by Media Cybernetics, Inc.) for such particle diameter determination.

<Surfactants>

An ink according to the present invention preferably contains surfactants for ejection properties enhancement and wettability enhancement. As such surfactants used, any of cationic, anionic, amphoteric, and nonionic surfactants is usable. Specific examples of surfactants applicable to the present invention are not specifically limited but the following is preferably usable.

As cationic surfactants, listed are, for example, aliphatic amine salts, aliphatic quaternary ammonium salts, benzalkonium salts, benzethonium chloride, pyridinium salts, and imidazolinium salts.

As anionic surfactants, listed are, for example, fatty acid soap, N-acyl-N-methylglycine salts, N-acyl-N-methyl-.β.-alanine salts, N-acylglutamic acid salts, acylated peptides, allylsulfonic acid salts, alkylbenzenesulfonic acid salts, alkylnaphthalenesulfonic acid salts, dialkylsulfosuccinic acid ester salts, alkylsulfoacetic acid salts, .α.-olefmsulfonic acid salts, N-acylmethyltauline, sulfated oil, higher alcohol sulfuric acid ester salts, secondary higher alcohol sulfuric acid ester salts, alkyl ether sulfuric acid salts, secondary higher alcohol ethoxysulfates, polyoxyethylene alkyl phenyl ether sulfuric acid salts, monoglysulfates, fatty acid alkylolamide sulfuric acid ester salts, alkyl ether phosphoric acid ester salts, and alkyl phosphoric acid ester salts.

As amphoteric surfactants, listed are, for example, carboxybetaine types, sulfobetaine types, aminocarboxylic acid salts, and imidazolinium betaine. And as nonionic surfactants, listed are, for example, polyoxyethylene secondary alcohol ether, polyoxyethylene alkyl phenyl ether, polyoxyethylene sterol ether, polyoxyethylene lanolin derivatives, polyoxyethylene polyoxypropylene alkyl ether, polyoxyethylene glycerin fatty acid esters, polyoxyethylene castor oil, cured castor oil, polyoxyethylene sorbitol fatty acid esters, polyoxyethylene glycol fatty acid esters, fatty acid monoglyceride, polyglycerin fatty acid esters, sorbitan fatty acid esters, propylene glycol fatty acid ester, saccharose fatty acid esters, fatty acid alkanolamides, polyoxyethylene fatty acid amides, polyoxyethylene alkylamines, alkylamine oxides, acetylene glycol, and acetylene alcohols.

Further, from the viewpoint of decreasing the surface tension of an ink, a portion of these surfactants is preferably substituted with a fluorine atom or a silicon atom.

These surfactants and solvents may be used individually or in combination.

<Other Additives>

An ink according to the present invention may further contain additives for various purposes. Depending on intended purposes to enhance various performances such as ejection stability, print head and ink cartridge compatibility, storage stability, and image storage stability, there can selectively be used, as appropriate, well-known additives such as polysaccharide, viscosity regulating agents, specific resistance regulating agents, coated film forming agents, ultraviolet absorbents, antioxidants, anti-fading agents, antifungal agents, and anti-stain agents, including, for examples, oil droplet fine particles such as liquid paraffin, dioctyl phthalate, tricresyl phosphate, or silicone oil; ultraviolet absorbents described in JP-A Nos. 57-74193, 57-87988, and 62-261476; anti-fading agents described in JP-A Nos. 57-74192, 57-87989, 60-72785, 61-146591, 1-95091, and 3-13376; and optical brightening agents described in JP-A Nos. 59-42993, 59-52689, 62-280069, 61-242871, and 4-219266.

<<Image Forming Method>>

In the method for forming an image of the present invention, the image formation is carried out on a nonabsorbable recording medium by ejecting an inkjet ink as liquid droplets from an inkjet head based on digital signals using a printer mounted with an inkjet ink according to the present invention.

The inkjet head used to carry out image formation by ejecting an ink according to the present invention may be either an on-demand system or a continuous system. Further, as the ejection system, there can be used any of the ejection systems including an electrical-mechanical conversion system (e.g., a single cavity type, a double cavity type, a vendor type, a piston type, a share mode type, and a shared-wall type) and an electrical-thermal conversion type (e.g., a thermal inkjet type and a BUBBLE JET (a registered trademark) type). Of these, in the image forming method of the present invention, a piezo-type inkjet recording head having a nozzle diameter of at most 30 µm is preferably used.

In the image forming method of the present invention, printing systems are not specifically limited, and either of a single-pass type or a scanning type may be employed. But the single-pass type is preferable in view of effective high-speed printing. A single-pass type method for forming an inkjet image is a method for forming an inkjet image in which when a recording medium is passed under one inkjet head unit, all dots are ejected to form an image in a single passing.

As a method to realize such a single-pass type image forming method, a line-head type inkjet head is preferably used.

Such a line-head type head refers to an inkjet head having a length of at least the width of a print range. In the line-head type inkjet head, a single head may cover at least the width of a print range, or plural heads may be constituted in combination to exceed the width of the print range as disclosed in JP-A No. 2007-320278.

One example of an inkjet recording apparatus usable for the image forming method of the present invention will now be described with reference to drawings.

Figure 1:
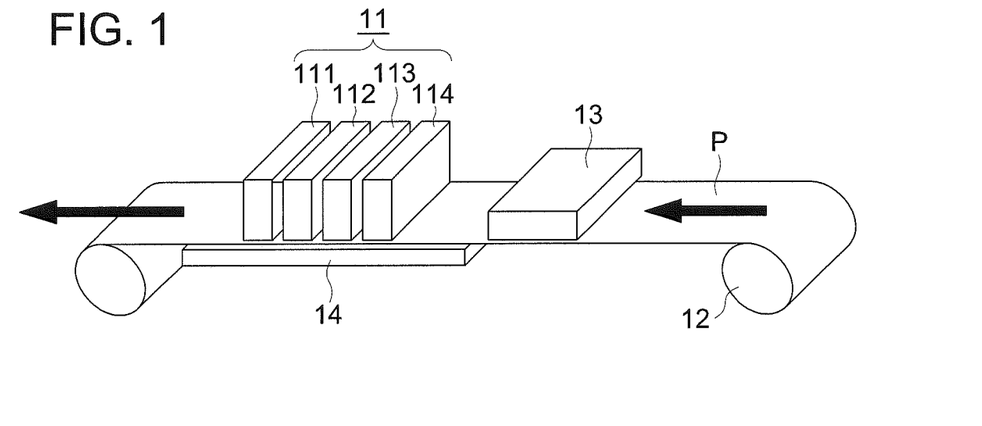
FIG. 1 is an example of the image forming apparatus of the inkjet recording method according to the present invention.

FIG. 1 is a schematic view showing an inkjet recording apparatus of a single-pass system (a line-head system) applicable to the method for forming the image of the present invention.

In FIG. 1, the symbol 11 represents a line-head type head unit, incorporating heads 111-114 ejecting inks each differing in hue. The nozzle pitch of each head is preferably about 360 dpi. Herein, the dpi referred to in the present invention represents the number of dots per 2.54 cm.

Printing coated paper P, a recording medium, is sent in a roll layered state from conveyance mechanism 12 in the arrow direction. In this case, printing coated paper P may previously be heated to a predetermined temperature using heating section 13 such as an infrared heater. The image formed surface is appropriately controlled so as to have a temperature of not less than 40° C. and not more than 90° C. specified by the present invention. In the case of not less than 40° C., the effect of increasing ink viscosity is sufficiently produced. In the case of at most 90° C., the effect of increasing the viscosity is appropriately maintained and in addition, damage to a recording medium can be reduced.

Figure 2:
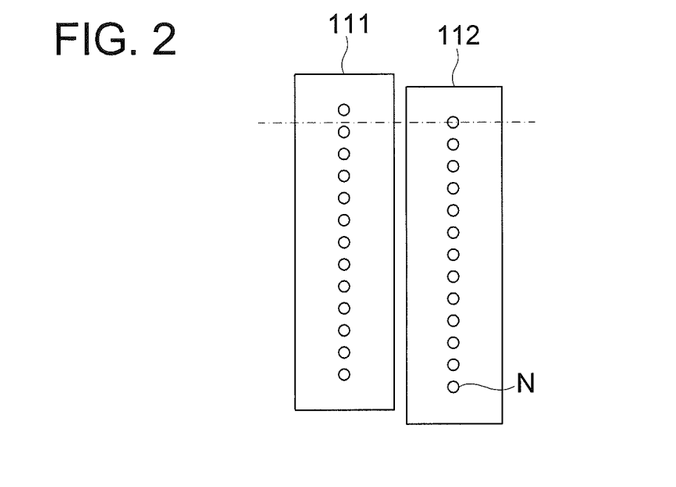
FIG. 2 is a figure showing arrangement of a head 111 and a head 112.

FIG. 2 is a bottom view showing a nozzle arrangement of each head bottom.

As shown in FIG. 2, nozzles N of head 111 and head 112, as well as head 113 and head 114 are placed in a zigzag arrangement so as to be displaced in a half pitch each. With such a head constitution, a more detailed image can be formed.

Figure 3:
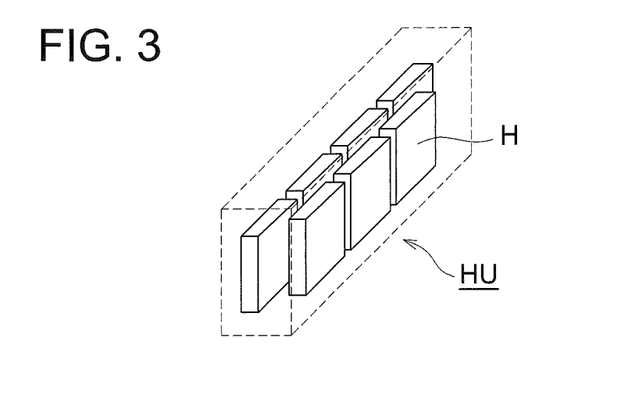
FIG. 3 is a figure showing a line head.

FIG. 3 is a schematic view showing one example of a head unit constitution

When printing coated paper P of a large printing width is used, head unit HU having plural heads H arranged in a zigzag arrangement is also preferably used to cover the entire width of printing coated paper P.

EXAMPLES

In the following, this invention will be specifically explained with reference to the example, but this invention not limited thereto. Incidentally, the expression of "part" or "%" referred to in Examples represents "part by mass" or "% by mass" unless otherwise specified.

<<Preparation of Pigment Dispersions>>

(Preparation of Magenta Pigment Dispersion-1)

As a pigment dispersing resin A, 20 parts by mass of HPD-96 (produced by BASF) and 65 parts by mass of ion exchanged water were mixed. Then 15 parts by mass of C.I. Pigment Red 122 was added to this liquid mixture for premixing, followed by being dispersed using a sand grinder filled with 0.5 mm zirconia beads at a volume ratio of 50% to give Magenta pigment dispersion-1 having a pigment solid content of 15%.

HPD-96 is a styrene-acrylic acid copolymer having an anionic group, having an acid value of 240 mgKOH/g, a molecular weight of 165,000 and pKa of 6.5, and is an aqueous solution neutralized by ammonium having solid content of 34%. pKa is determined by titrating a 100 ml of an aqueous solution having solid content of 0.5% via 0.02N of hydrochloric acid aqueous solution with a rate of 1 drop/3 minutes while stirring.

(Preparation of Magenta Pigment Dispersion-2)

As a pigment dispersing resin B, 3 parts by mass of JONCRYL 678 (produced by BASF), 1.3 parts by mass of dimethylaminoethanol, and 80.7 parts by mass of ion exchange water were mixed while heating. Then 15 parts by mass of C.I. Pigment Red 122 was added to this liquid mixture for premixing, followed by being dispersed using a sand grinder filled with 0.5 mm zirconia beads at a volume ratio of 50% to give a magenta pigment dispersion having a pigment solid content of 15%.

JONCRYL 678 is an acrylic acid—methacrylic acid copolymer having an acid value of 215 mgKOH/g, an average molecular weight of 8,500, and pKa of 6.3.

(Preparation of Magenta Pigment Dispersion-3)

(Synthesis of Dispersing resin-3)

Into a f flask provided with a dropping funnel, a nitrogen gas directing tube, a reflux condenser, a thermometer, and a mechanical stirrer, were loaded 150 g of isopropyl alcohol, and heated at 80° C. to reflux. Into the dropping funnel, 21 parts of maleic anhydride, 79 parts of methyl methacrylate, and 1 part of azobisisobutyronitrile were dissolved in mixture, and the mixture was dropped for about 2 hours and reacted for 5 hours in a state of heated at the same temperature. Thereafter, isopropyl alcohol was distilled away, 105 parts of maleic acid-acrylic acid resin (resin solid content: 95%) having an acid value of 240 mgKOH/g, a molecular weight of 10,000, and pKa of 5.7 was obtained.

Three parts by mass of the pigment dispersing agent above described, 3.3 parts by mass of dimethyl aminoethanol and 78.7 parts by mass of ion exchanged water were mixed to heat. Then 15 parts by mass of C.I. Pigment Red 122 was added to this liquid mixture for premixing, followed by being dispersed using a sand grinder filled with 0.5 mm zirconia beads at a volume ratio of 50% to give Magenta pigment dispersion-3 having a pigment solid content of 15%.

(Preparation of Magenta Pigment Dispersion-4)

(Synthesis of Dispersing resin -4)

Into a f flask provided with a dropping funnel, a nitrogen gas directing tube, a reflux condenser, a thermometer, and a mechanical stirrer, were loaded 150 g of isopropyl alcohol, and heated at 80° C. to reflux. Into the dropping funnel, 39 parts of styrene sulfonate, 61 parts of methyl methacrylate, and 1 part of azobisisobutyronitrile were dissolved in mixture, and the mixture was dropped for about 2 hours and reacted for 5 hours in a state of heated at the same temperature. Thereafter, isopropyl alcohol was distilled away, 105 parts of polystyrene sulfonate resin (resin solid content: 95%) having an acid value of 210 mgKOH/g, a molecular weight of 15,000, and pKa of 3 was obtained.

Three parts by mass of the pigment dispersing agent above described, 1.3 parts by mass of dimethyl aminoethanol and 80.7 parts by mass of ion exchanged water were mixed to heat. Then 15 parts by mass of C.I. Pigment Red 122 was added to this liquid mixture for premixing, followed by being dispersed using a sand grinder filled with 0.5 mm zirconia beads at a volume ratio of 50% to give Magenta pigment dispersion-4 having a pigment solid content of 15%.

(Preparation of Cyan Pigment Dispersions 1-4)

Cyan pigment dispersions 1-4 having a pigment solid content of 15% were prepared in the same manner except for changing a pigment to C.I. Pigment Blue 15:3 from C.I. Pigment Red 122.

<<Preparation of Inks>>

(Preparation of Ink 1-M)

| | |
|---|---|
| Magenta pigment dispersion-1 | 33 parts by mass |
| Water soluble amphoteric resin: RAM-Resin 1000 (produced by Osaka Organic Chemical Industry Ltd.) (solid content: 30.4%) | 10 parts by mass |
| Ammonium acetate (Acetic acid: pKa 4.76) | 2 parts by mass |
| Surfactant: Olefin E1010 (acetylene glycol-based surfactant, produced by Nissin Chemical Industry Co., Ltd.) | 0.5 parts by mass |
| 2-propanol | 5 parts by mass |
| Propylene glycol | 10 parts by mass |
| 1,2-Hexanediol | 5 parts by mass |
| Diethylene glycol monobutyl ether | 5 parts by mass |
| Glycerin | 20 parts by mass |
| Water | 9.5 parts by mass |

(Preparation of Inks 2-M to 4-M, 6-M and 7-M)

Inks 2-M to 4-M, 6-M and 7-M were prepared in the same manner except for changing ammonium salt in Ink 1 to the same content of salt, acid and amine listed in Table 1.

(Preparation of Ink 5-M)

| | |
|---|---|
| Magenta pigment dispersion-1 | 33 parts by mass |
| Water soluble amphoteric resin: RAM-Resin 1000 (produced by Osaka Organic Chemical Industry Ltd.) (solid content: 30.4%) | 10 parts by mass |
| Acetic acid (pKa 4.76) | 2 parts by mass |
| Dimethylethanol amine | 2 parts by mass |
| Surfactant: Olefin E1010 (acetylene glycol-based surfactant, produced by Nissin Chemical Industry Co., Ltd.) | 0.5 parts by mass |
| 2-propanol | 5 parts by mass |
| Propylene glycol | 10 parts by mass |
| 1,2-Hexanediol | 5 parts by mass |
| Diethylene glycol monobutyl ether | 5 parts by mass |
| Glycerin | 20 parts by mass |
| Water | 9.5 parts by mass |

(Preparation of Ink 8-M)

| | |
|---|---|
| Magenta pigment dispersion-1 | 33 parts by mass |
| Water soluble amphoteric resin: RAM-Resin 1000 (produced by Osaka Organic Chemical Industry Ltd.) (solid content: 30.4%) | 10 parts by mass |
| Surfactant: Olefin E1010 (acetylene glycol-based surfactant, produced by Nissin Chemical Industry Co., Ltd.) | 0.5 parts by mass |
| 2-propanol | 5 parts by mass |
| Propylene glycol | 10 parts by mass |
| 1,2-Hexanediol | 5 parts by mass |
| Diethylene glycol monobutyl ether | 5 parts by mass |
| Glycerin | 20 parts by mass |
| Water | 11.5 parts by mass |

(Preparation of Inks 9-M, 10-M and 14-M)

Inks 9-M, 10-M and 14-M were prepared in the same manner except for changing RAM-Resin 1000 in Ink 1 to the same content of water soluble amphoteric resin or amphoteric aqueous dispersion listed in Table 1.

Herein, a soluble amphoteric resin and an amphoteric aqueous dispersion listed in Table 1 will be detailed as follows.

RAM-Resin 2000: Water soluble amphoteric resin (produced by Osaka Organic Chemical Industry Ltd.) (Solid content: 30.4%)

RAM-Resin 4000: Water soluble amphoteric resin (produced by Osaka Organic Chemical Industry Ltd.) (Solid content: 30.3%)

Herein, an amphoteric aqueous dispersed resin-1 is an aqueous dispersed resin which has anionic group and cationic group and has composition comprising methyl methacrylate 45 mol %, ethyl acrylate 45 mol %, methacrylic acid 1 mol %, and dimethylaminoethyl methacrylate 9 mol %, having molecular weight of 16,000 and synthesized by solution polymerization method.

(Preparation of Inks 11-M to 13-M)

Inks 11-M to 13-M were prepared in the same composition except for changing Magenta dispersion -1 in Ink 1 to Magenta dispersion-2 to Magenta dispersion-4.

Inks 1-C to 14-C were prepared in the same manner except for changing Magenta pigment dispersion to the same content of Cyan pigment dispersion.

(Preparation of Ink Sets 1 to 14)

A combination of Ink 1-M and 1-C refers to as Ink set 1. As well as Ink set 1, Ink sets 2 to 14 were prepared by combining M and C.

Herein, details of abbreviations listed in Table 1 are as follows:

DMAE: Dimethyl ethanol amine

Acetic acid Na: Sodium acetate

<<Formation of Print Images>>

[Formation of Image 1]

Using Ink set 1, Image 1 was formed on printing coated paper by the following printing method.

As an inkjet recording apparatus, the inkjet recording apparatus of a single-pass system (a line-head system) described in FIG. 1 was used. As printing coated paper, Mirror coat Platinum (cast coat paper, Oji Paper Co., Ltd.) was used, while being conveyed at a conveyance rate of 280 mm/s, the image formed surface of recording medium P was heated to 40° C. using heating unit 13 or 14, and then Ink set 1 was ejected from head unit 11. Herein, the print surface tempera- <<Evaluation of Formed Images>>

[Evaluation of Bleeding Resistance]

A solid image was printed in which a cyan image of a printing rate of 100% was printed on a part of a magenta image of a printing rate of 100%. The presence or absence of occurrence of bleeding (image bleeding) was visually observed. Bleeding resistance was evaluated based on the following criteria.

A: Almost no bleeding occurrence is noted.
B: Bleeding of a cyan image of less than 0.5 mm was noted.
C: Bleeding of a cyan image of from not less than 0.5 mm to less than 10 mm was noted
D: Bleeding of a cyan image of at least 0.5 mm was noted.

TABLE 1

| Image No. | Ink Set No. | Main Ink Composition (A) | (B) | (C) | (D) | pKa (A) | pKa (C) | Recording Medium | Heating Temperature (° C.) | Bleeding Resistance | Remarks |
|---|---|---|---|---|---|---|---|---|---|---|---|
| 1 | 1 | Ammonium acetate | | HPD96 | RAM-Resin 1000 | 4.76 | 6.7 | Coated paper | 40 | A | Inv. |
| 2 | 2 | Ammonium lactate | | HPD96 | RAM-Resin 1000 | 3.66 | 6.7 | Coated paper | 40 | A | Inv. |
| 3 | 3 | Ammonium salicylate | | HPD96 | RAM-Resin 1000 | 2.96 | 6.7 | Coated paper | 40 | A | Inv. |
| 4 | 4 | Ammonium tartrate | | HPD96 | RAM-Resin 1000 | 3.04 | 6.7 | Coated paper | 40 | A | Inv. |
| 5 | 5 | Acetic acid | DMAE | HPD96 | RAM-Resin 1000 | 4.76 | 6.7 | Coated paper | 40 | B | Inv. |
| 6 | 6 | Ammonium carbonate | | HPD96 | RAM-Resin 1000 | 10.33 | 6.7 | Coated paper | 40 | C | Comp. |
| 7 | 7 | Acetic acid | Na | HPD96 | RAM-Resin 1000 | 4.76 | 6.7 | Coated paper | 40 | C | Comp. |
| 8 | 8 | — | — | HPD96 | RAM-Resin 1000 | — | 6.7 | Coated paper | 40 | D | Comp. |
| 9 | 9 | Ammonium acetate | | HPD96 | RAM-Resin 1000 | 4.76 | 6.7 | Coated paper | 40 | A | Inv. |
| 10 | 10 | Ammonium acetate | | HPD96 | RAM-Resin 1000 | 4.76 | 6.7 | Coated paper | 40 | A | Inv. |
| 11 | 11 | Ammonium acetate | | JOHNCRYL678 | RAM-Resin 1000 | 4.76 | 6.3 | Coated paper | 40 | A | Inv. |
| 12 | 12 | Ammonium acetate | | Dispersing resin-3 | RAM-Resin 1000 | 4.76 | 5.7 | Coated paper | 40 | A | Inv. |
| 13 | 13 | Ammonium acetate | | Dispersing resin-4 | RAM-Resin 1000 | 4.76 | 3.0 | Coated paper | 40 | C | Comp. |
| 14 | 14 | Ammonium acetate | | HPD96 | Amphoteric aqueous dispersed resin1 | 4.76 | 6.7 | Coated paper | 40 | A | Inv. |
| 15 | 1 | Ammonium acetate | | HPD96 | RAM-Resin 1000 | 4.76 | 6.7 | Vinyl chloride | 90 | A | Inv. |
| 16 | 2 | Ammonium lactate | | HPD96 | RAM-Resin 1000 | 3.66 | 6.7 | Vinyl chloride | 90 | A | Inv. |
| 17 | 1 | Ammonium acetate | | HPD96 | RAM-Resin 1000 | 2.96 | 6.7 | Coated paper | 30 | B | Inv. |

(A) Organic or Inorganic acid,
(B): Amine,
(C): Resin having anionic group,
(D): Amphoteric resin
Inv.: Inventive example,
Comp.: Comparative example ture of the printing coated paper was determined using a non-contact type infrared thermometer.

With regard to each of the heads (111-114) constituting head unit 11, the nozzles of two heads each featuring 360 dpi arranged in a staggered arrangement as described in FIG. 2. As shown in FIG. 3, to cover the entire width of the printing coated paper, a plurally-arranged line-head system was constituted. Ink 1-M constituting Ink set 1 was ejected from head 112 and ink 1-C constituting Ink set 1 was ejected from head 111 each at a print resolution of 720×720 dpi and an ink droplet amount of 16 pl. A solid cyan image of a printing rate of 100% was printed on a part of a solid magenta image of a printing rate of 100% to give Image 1.

[Formation of Images 2 to 14]

Using Ink sets 2 to 14, images were formed in the same manner as in Formation of Image 1.

[Formation of Images 15 and 16]

Using Ink sets 1 and 2, images were formed in the same manner except that the recording medium was changed to vinyl chloride (produced by Metamark) and the image formed surface was set at 90° C.

[Formation of Image 17]

Using Ink set 1, images were formed in the same manner except that the image formed surface was set at 30° C.

The results described in Table 1 clearly show that the images formed based on the image forming method of the present invention exhibit enhanced bleeding resistance compared to the comparative examples.

DESCRIPTION OF THE ALPHANUMERIC DESIGNATIONS 11, 41: head units
111, 112, 113, 114, 411, 412, 413, and 414: heads
12: conveyance mechanism
13: heating section
14: temperature control plate
P: printing coated paper

What is claimed is:

1. An aqueous ink for an inkjet recording comprising water, a pigment, an organic or an inorganic acid (A), and an ammonia or an amine (B) or an ammonium salt comprising the organic or the inorganic acid (A) and the ammonia or the amine (B), a resin having an anionic groups (C), and an amphoteric resin having both an anionic and a cationic group (D), wherein the following relationship is satisfied:

$$pKa(A) < pKa(C) < 7,$$

provided that pKa(A) represents pKa of the organic or the inorganic acid (A) and pKa(C) represents pKa of the resin having the anionic group (C).

2. The aqueous ink for the inkjet recording of claim 1, wherein pKa of the organic or the inorganic acid (A) is not more than 5.

3. The aqueous ink for the inkjet recording of claim 1 comprising a water of not less than 20% by mass and not more than 90% by mass.

4. The aqueous ink for the inkjet recording of claim 1, wherein the pigment is dispersed by the resin having the anionic groups (C).

5. An inkjet recording method utilizing the aqueous ink for the inkjet recording of claim 1, wherein an image forming surface is heated.

6. The inkjet recording method of claim 5, wherein the image forming surface is heated at not less than 40° C. and not more than 90° C.

* * * * *